May 13, 1924.
P. C. ELLIOTT
CRANK SHAFT
Filed Sept. 15, 1921
1,494,106
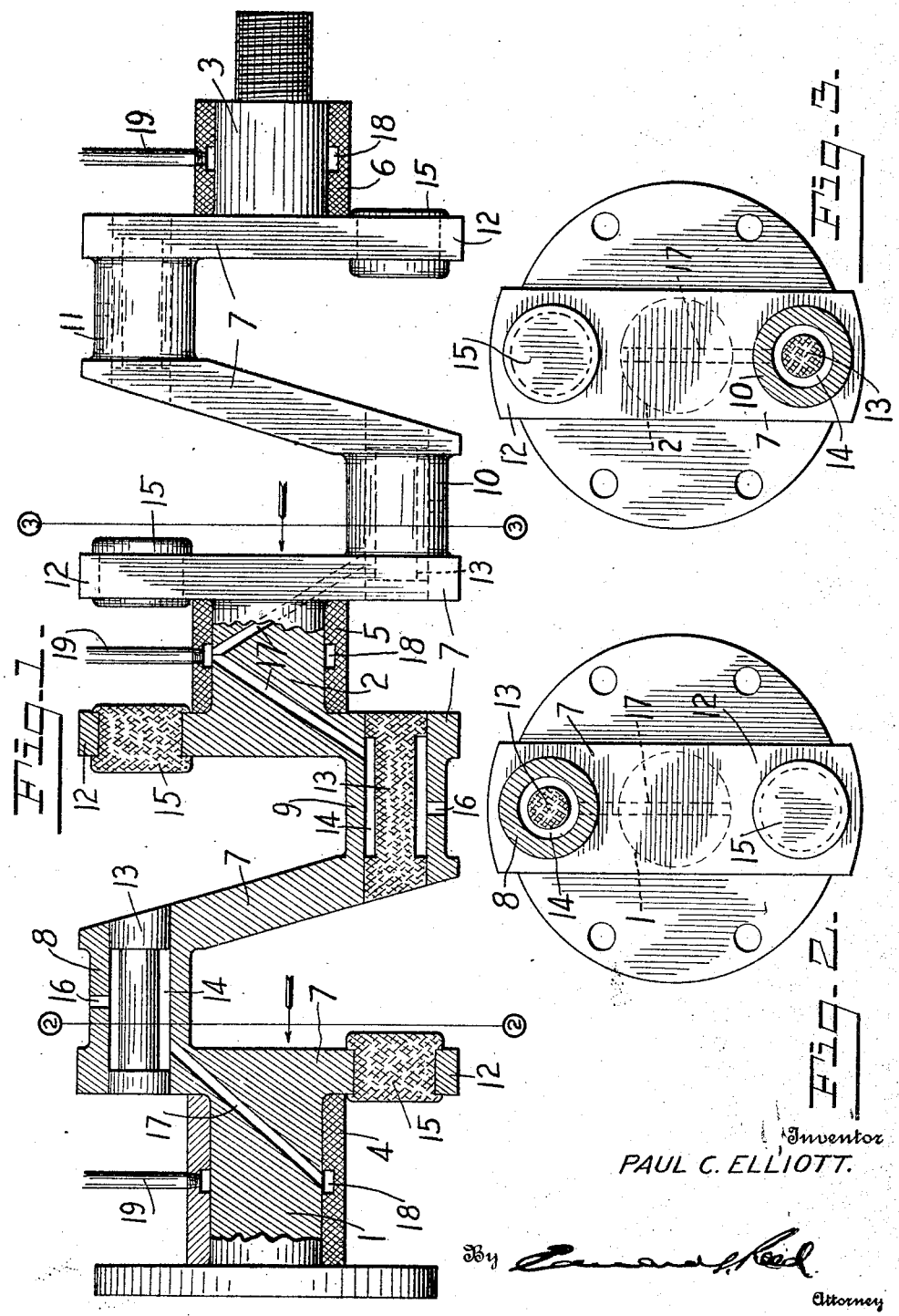
Inventor
PAUL C. ELLIOTT.

Patented May 13, 1924.

1,494,106

UNITED STATES PATENT OFFICE.

PAUL C. ELLIOTT, OF DAYTON, OHIO.

CRANK SHAFT.

Application filed September 15, 1921. Serial No. 500,909.

*To all whom it may concern:*

Be it known that I, PAUL C. ELLIOTT, a citizen of the United States, residing at Dayton, in the county of Montgomery and State of Ohio, have invented certain new and useful Improvements in Crank Shafts, of which the following is a specification, reference being had therein to the accompanying drawing.

This invention relates to crank shafts for internal combustion engines and the like.

One object of the invention is to provide a simple, highly efficient, means for counterbalancing the crank shaft of an internal combustion engine.

A further object of the invention is to provide a simple, efficient, lubricating system for the bearings of such a crank shaft.

Other objects of the invention may appear as the device is described in detail.

In the accompanying drawings Fig. 1 is a side elevation, partly in section, of a crank shaft embodying my invention; Fig. 2 is a section taken on the line 2—2 of Fig. 1; and Fig. 3 is a section taken on the line 3—3 of Fig. 1.

In these drawings I have illustrated one embodiment of my invention and have shown the same as applied to a crank shaft for a four cylinder engine, which comprises three fixed trunnions, 1, 2 and 3, adapted to be mounted in fixed bearings 4, 5 and 6, the shaft is provided with the usual crank portions 7 carrying the connecting rod trunnions, 8, 9, 10 and 11, with which the connecting rods of the engine are connected in the usual manner.

Those portions of the crank arms adjacent to the fixed bearings are provided with extensions 12 which project across the trunnions 1, 2 and 3, respectively, and into line with the adjacent connecting rod trunnions. The alined extensions and connecting rod trunnions are provided with openings extending lengthwise of the axis of the shaft and preferably formed therein by a single boring operation, this being necessary in the present instance because of the inability to apply a boring tool to the connecting rod trunnions.

The openings, or bores, in the connecting rod trunnions have inserted therein fillers, or plugs, 13 which are preferably pressed into the openings and which are provided with circumferential channels 14. These fillers, or plugs, are preferably of light metal such as aluminum and by providing the same with relatively large circumferential channels their weight is further reduced. Consequently, the weight of the crank arm is relatively small. The openings in the extensions 12 on the crank arms receive weights which will counterbalance the weight at the connecting rod trunnion. Preferably cores, or plugs of lead or other heavy material, 15 are molded into the openings in the crank arm extension and by means of die casting these plugs may be cast in place and their weight very accurately gauged. Consequently, the counterweight in the shaft is a comparatively simple operation and can be very quickly and accurately accomplished.

The circumferential channels 14 and the fillers 13 also serve as lubricant receptacles by means of which the connecting rod bearings are lubricated. To this end each of these chambers, or channels, communicate with the bearing surfaces of their trunnions by means of a port 16 and is further connected by a conduit 17 extending through a portion of the crank arm and through the adjacent fixed trunnion with a circumferential channel 18 formed in the fixed bearings and connected by pipes 19 with a suitable source of oil supply, such as the pressure lubricating system for the engine.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. A crank shaft having trunnions adapted to be mounted in stationary bearings and crank arms carrying connecting rod trunnions, the crank arms adjacent to the first mentioned trunnions having parts extending beyond said trunnions and into line with the adjacent connecting rod trunnions, said parts and said connecting rod trunnions having openings extending lengthwise of said shaft, a filler fitting snugly in the opening in each connecting rod trunnion, and a counter-weight mounted in the opening in the extended part of each of said crank arms.

2. A crank shaft having trunnions adapted to be mounted in stationary bearings and crank arms carrying connecting rod trunnions, the crank arms adjacent to the first mentioned trunnions having parts extending beyond said trunnions and into line with the adjacent connecting rod trunnions, said parts and said connecting rod trunnions having openings extending lengthwise of said shaft, a filler fitting snugly in the opening in each connecting rod trunnion and having a circumferential channel, and a counter-weight of heavy material molded in the opening in the extended part of each of said crank arms.

3. A crank shaft having axial trunnions and having crank arms carrying connecting rod trunnions, fixed bearings for said axial trunnions, each of said bearings having a circumferential channel communicating with a source of oil supply, the crank arms adjacent to said axial trunnions having parts extending beyond said trunnions into line with the adjacent connecting rod trunnions, said parts in the adjacent trunnions having openings therein extending lengthwise of said shaft, a filler mounted in the opening in each connecting rod trunnion and provided with a circumferential channel, a conduit leading from said circumferential channel to the circumferential channel of the adjacent fixed bearing, and a port leading from the circumferential channel of said filler to the bearing surface of a trunnion, and a counter-weight mounted in the opening in the extended part of each of said crank arms.

In testimony whereof, I affix my signature hereto.

PAUL C. ELLIOTT.